United States Patent [19]

Kawaoka

[11] Patent Number: 5,589,889
[45] Date of Patent: Dec. 31, 1996

[54] IMAGE MEMORY DEVICE AND METHOD OF OPERATING SAME

[75] Inventor: Yoshiki Kawaoka, Tokyo, Japan

[73] Assignee: Fuji Photo Film Co., Ltd., Japan

[21] Appl. No.: 235,221

[22] Filed: Apr. 29, 1994

Related U.S. Application Data

[63] Continuation of Ser. No. 868,208, Apr. 14, 1992, abandoned.

[30] Foreign Application Priority Data

Apr. 16, 1991 [JP] Japan .................................... 3-109620

[51] Int. Cl.$^6$ .................................................. H04N 5/202
[52] U.S. Cl. ............................................ 348/674; 348/671
[58] Field of Search ...................... 358/164, 32; 348/671, 348/672, 674, 675, 254; H04N 5/202

[56] References Cited

U.S. PATENT DOCUMENTS 5,196,924  3/1993  Lumelsky et al. ...................... 358/32

FOREIGN PATENT DOCUMENTS

| 3238281 | 4/1984 | Germany | 358/164 |
| 6576 | 1/1981 | Japan . | |
| 108474 | 5/1988 | Japan . | |
| 7676 | 1/1990 | Japan . | |

OTHER PUBLICATIONS

Haines, Frederick J, "Understanding Gamma Correction" Video Systems, Nov. 1977, pp. 20–24.
Baxes, Gregory A "Digital Image Processing" Prentice–Hall Inc pp. 69–70 1984.

*Primary Examiner*—David E. Harvey

[57] ABSTRACT

An image memory device is so adapted as to make it possible to use an image pick-up device having any characteristic and a display unit having any characteristic. The image memory device includes an input look-up table and an output look-up table. Data for performing a reverse gamma-correction is set in the input look-up table in advance in dependence upon the image pick-up device used. By virtue of the reverse gamma-correction, the image data is provided with linear characteristics. The reverse gamma-corrected data is stored in the memory. Data for performing a gamma correction is set in the output look-up table in advance in dependence upon the display unit used.

4 Claims, 1 Drawing Sheet

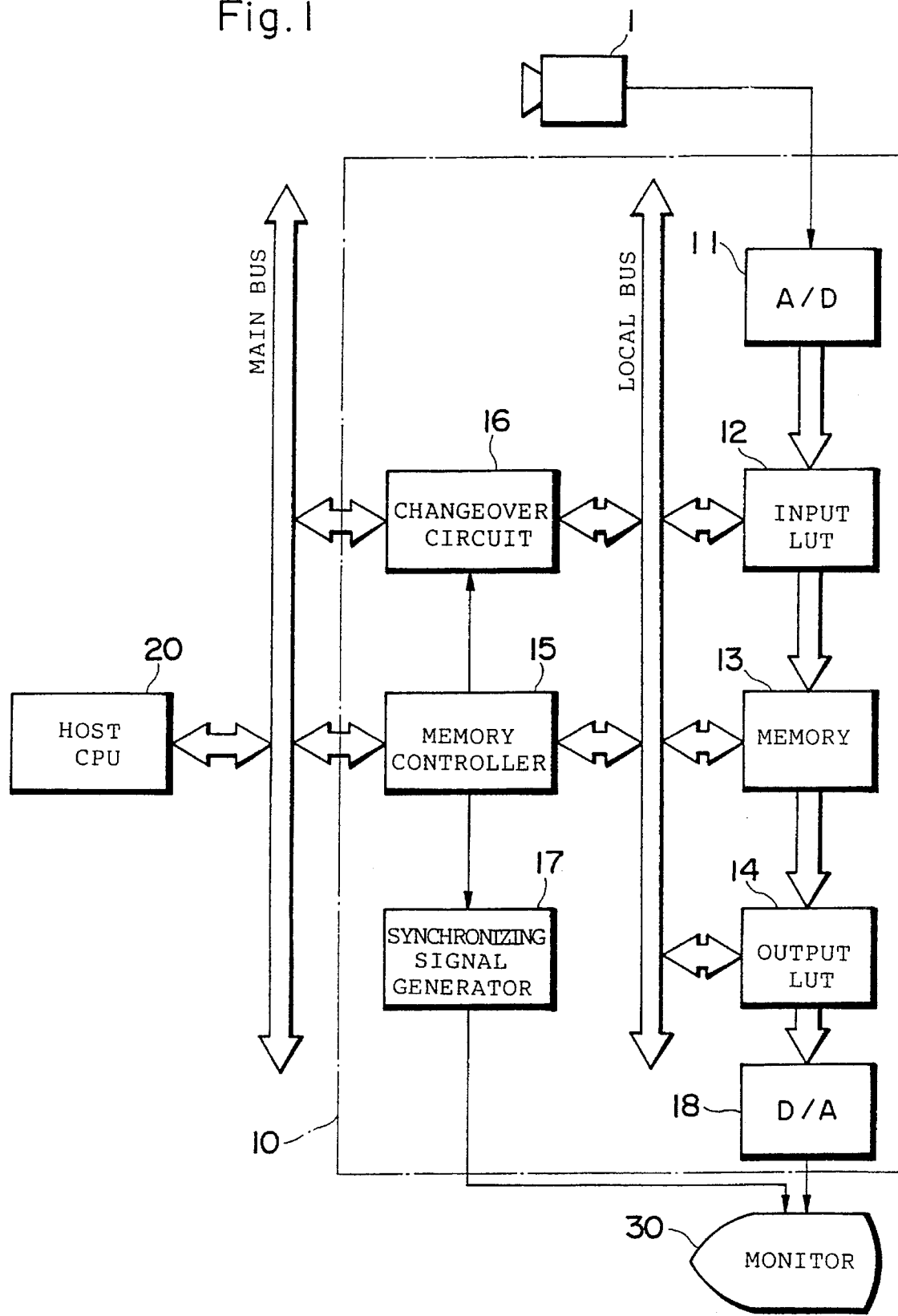

IMAGE MEMORY DEVICE AND METHOD OF OPERATING SAME

This application is a continuation of Ser. No. 868,208 filed Aug. 14, 1992 now abandoned.

BACKGROUND OF THE INVENTION

1. Field of the Invention

This invention relates to an image memory device and a method of operating the device.

2. Description of the Related Art

In a computer system having an image memory device, an image preserved in the image memory device is displayed on a display unit dedicated to the computer system.

Image pick-up devices for ordinary video cameras, still-video cameras and the like have been developed, and it is required that the image data resulting from the imaging operation of such image pick-up devices be preserved in an image memory device. It is also desired that an image based upon image data preserved in the image memory device be capable of being displayed not only on a display unit dedicated to a computer system but also on a display unit of the type desired by the user.

However, there are cases where the incident-light luminance vs. output-signal characteristics differ from one type of image pick-up to another. Similarly, there are case where the input signal vs. output-light luminance characteristics differ from one type of display device to another. Accordingly, image pick-up devices and display devices which a user desires cannot always be employed or combined arbitrarily. The reason for this is that consideration must be given to the tone reproducibility of the image to be displayed.

SUMMARY OF THE INVENTION

Accordingly, an object of the present invention is to provide a general-purpose image memory device which enables any type of image pick-up means and display means to be used, as well as a method of operating the device.

According to the present invention, the foregoing object is attained by providing an image memory device comprising: A/D converting means for converting an analog video signal, which is provided by image pick-up means, into digital image data; input reverse-gamma correcting means having a rewritable input look-up table with data stored therein for applying a reverse gamma correction to image data, which is provided by the A/D converting means, in order to convert, into linear characteristics, non-linear incident-light luminance vs. output-signal characteristics of the image pick-up means, a reverse gamma correction being applied to the image data using the data of the input look-up table; memory means for storing the image data corrected by the input reverse-gamma correcting means; output gamma correcting means having a rewritable output look-up table with data stored therein for applying a gamma correction to image data, which is read out of the memory means, in order to make the linear characteristics conform to non-linear input signal vs. output-light luminance characteristics of display means, the gamma correction being applied to image data, which is read out of the memory means, using the data of the output look-up table; and D/A converting means for converting the image data, which has been corrected by the output gamma correcting means, into an analog video signal in order to be applied to the display means.

In a preferred embodiment, the image memory device further comprises processing means for creating reverse gamma-correction data, which is to be set in the input look-up table, in dependence upon the image pick-up means used, and gamma-correction data, which is to be set in the output look-up table, in dependence upon the display means used.

According to the present invention, the foregoing object is attained by providing a method of operating an image memory device comprising the steps of: creating, in dependence upon image pick-up means used, and storing beforehand in an input look-up table, reverse gamma-correction data for converting, into linear characteristics, non-linear incident-light luminance vs. output-signal characteristics of the image pick-up means; creating, in dependence upon display means used, and storing beforehand in an output look-up table, gamma-correction data for making the linear characteristics conform to non-linear input signal vs. output-light luminance characteristics of the display means; converting an analog video signal, which is provided by the image pick-up means, into digital image data; applying a reverse gamma-correction to the image data using the reverse gamma-correction data of the input look-up table; and storing the corrected image data in memory means.

In a preferred embodiment of the invention, the operating method further comprises the steps of: reading image data out of the memory means; applying a gamma correction to the image data read out of the memory means using the gamma-correction data of the output look-up table; converting the corrected image data into an analog video signal; and applying the analog video signal to the display means.

The analog video signal provided by the image pick-up means is converted into digital image data by the A/D converting means, and a reverse gamma-correction is applied to the image data using the data of the input look-up table. The image data which has been subjected to the reverse gamma-correction is stored in the memory means. As a result, the non-linear incident-light luminance vs. output-signal characteristics of the image pick-up means is converted into linear characteristics.

The image data stored in the memory means is gamma-corrected using the output look-up table, the gamma-corrected data is converted into an analog signal by the D/A converting means, and the analog signal is displayed on the display means. As a result, the image data which has linear characteristics and is stored in the image means is made to conform to the non-linear input signal vs. output-light luminance characteristics possessed by the display means.

The reverse gamma-correction data of the input look-up table is created in dependence upon the incident-light luminance vs. output-signal characteristics of the image pick-up means used. The gamma-correction data of the output look-up table is created in dependence upon the input signal vs. output-luminance characteristic possessed by the display means used.

In accordance with the present invention, the reverse gamma-correction data and the gamma-correction data are created in dependence upon the characteristics of the image pick-up means and the display means used, respectively, and the reverse gamma-correction data and gamma-correction data are set rewritably in the input look-up table and output look-up table, respectively. As a result, the image pick-up means and the display means desired by the user are capable of being employed. Furthermore, since an appropriate reverse gamma-correction and gamma correction can be applied even if the image pick-up means and the display means desired by the user are employed, excellent tone reproducibility can be obtained for the displayed image. In addition, regardless of the image pick-up means used to obtain the image data that has been reverse gamma-corrected and accumulated in the memory means, the data always possesses linearity (yγ1). Therefore, when this image data is worked upon in the image memory device, it is unnecessary to make the processing for accomplishing this conform to the type of image pick-up means and the type of display means. The processing is greatly facilitated and can be provided with universality.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a block diagram illustrating an embodiment of an image memory device according to the present invention.

DESCRIPTION OF THE PREFERRED EMBODIMENT

FIG. 1 is a block diagram illustrating an embodiment of an image memory device according to the present invention.

The image memory device is assembled on a board 10 detachably mounted on a computer system. When mounted on the computer system, the board 10 is connected to a host computer 20 of the system via a bus.

The board 10 is provided with an A/D converting circuit 11 for converting an analog video signal, which is inputted from a video camera 1, into digital image data; an input look-up table (LUT) 12 for storing reverse gamma-correction data used in a data conversion for reverse gamma correction; a memory 13 for storing image data reverse gamma-corrected using the input look-up table 12; an output look-up table 14 for storing gamma-correction data used in a data conversion for a gamma correction; a D/A converting circuit 18 for converting image data gamma-corrected by the output look-up table 14 into an analog video signal; a bus changeover circuit 16 for changing over a bus connection between a host CPU 20 and the input look-up table 12, the memory 13 and the output look-up table 14; a synchronizing signal generating circuit 17 applies a synchronizing signal for a video signal, which is outputted by a D/A converting circuit 18, to a display unit 30 to which the video signal is applied; and a memory controller 15 for controlling, in dependence upon an instruction from the host CPU 20, the writing/reading of image data to and from the memory 13, the writing of correction data to the input and output look-up tables 12, 14, and the conversion of data (gamma-correction processing and reverse gamma-correction processing), and for controlling the bus changeover circuit 16 and the synchronizing signal generating circuit 17 following the above-mentioned control.

The analog video signal, which represents the image of a subject photographed by the video camera 1, is applied to the A/D converting circuit 11, whereby the analog video signal is converted into digital image data and then applied to the input look-up table 12.

Reverse gamma-correction data, which is for applying a reverse gamma correction to the input image data, is rewritably stored in the input look-up table The level of the video signal outputted by the video camera 1 has non-linear characteristics with respect to the luminance of the subject. However, the luminance of the subject and the video signal are converted into data having linear characteristics by the input look-up table 12. For example, the level of the output video signal from the video camera 1 is raised to a power of 2.2. As a result, data processing, such as the adjustment of color data in image data, is facilitated.

The input look-up table 12 ordinarily stores the output data that has followed a reverse gamma correction (namely reverse gamma-correction data). This data is stored so as to conform to the input data. Preferably, the input data is used as an address signal indicative of the memory location at which the output data corresponding to the input data is stored. Then, if the image data from the A/D converting circuit 11 is applied to the input look-up table 12 as an address signal, the image data resulting from the reverse gamma correction will be outputted from the input look-up table 12. The reading of the output data from the input look-up table 12 is controlled by the memory controller 15.

The input look-up table 12 can be realized using an SRAM, by way of example. The setting of the reverse gamma-correction data in the input look-up table 12, and the rewriting of this data, are carried out by the host CPU 20. In dependence upon the video camera 1 applied to the image memory device, the host CPU 20 creates the reverse gamma-correction data to be written in the input look-up table 12 and applies the data to the image memory device via the bus. The reverse gamma-correction data is written in the input look-up table 12 through the bus changeover circuit 16 under the control of the memory controller 15.

The image data that has been reverse gamma-corrected by the input look-up table 12 is applied to the memory 13, where the data is stored.

The host CPU 20 is capable of accessing the image data that has been stored in the memory 13. The reading/writing of image data in the memory 13 by the host CPU 20 is carried out under the control of the memory controller 15, and the image data is transferred between the host CPU 20 and the memory 13 through the bus changeover circuit 16. The host CPU 20 is capable of subjecting the image data read out of the memory 13 to prescribed processing. For example, the host CPU 20 may subject the image data to data processing such as that for adjusting color data. The image data that has been subjected to data processing is again applied to the memory 13, where the data is stored.

When the image data that has been stored in the memory 13 is displayed on the display unit 30, the data is read out of the memory 13 and applied to the output look-up table 14.

The output look-up table 14 is for carrying out data conversion for making the image data, which has linear characteristics, conform to the non-linear input signal vs. output-light luminance characteristics of the display unit 30. Gamma-correction data for applying a gamma correction to the input image data is stored in the output look-up table 14 and is capable of being rewritten.

Since the input signal vs. output-luminance characteristics of the display unit 30 is gamma-corrected by the output look-up table 14 so as to be provided with non-linear characteristics, the image displayed on the display unit 30 possesses appropriate tone characteristics. For example, the image data outputted by the output look-up table 14 is converted so as to be the 0.45 power of the image data inputted to the output look-up table 14 (γ=0.45).

The output look-up table 14 also is capable of using an SRAM in the same manner as the input look-up table 12.

Preferably, the output look-up table 14 also stores gamma-corrected image data in conformity with the input image data, wherein image data that has been subjected to a gamma correction is stored at an addressed memory location in which the corresponding input image data serves as an address signal. The gamma-correction data in the output look-up table 14 also is created by the host CPU 20 in dependence upon the display unit 30 used, and this data is written in the output look-up table 14.

The gamma-corrected image data outputted by the output look-up table 14 is converted into an analog video signal by the D/A converting circuit 18, and the analog video signal is then applied to the display unit 30. A synchronizing signal outputted by the synchronizing signal generating circuit 17 also is applied to the display unit 30, and the signal represented by the analog video signal is displayed on the display unit 30 in synchronization with this synchronizing signal.

The image data stored in the memory 13 is converted by the input look-up table 12 so as take on linearity with respect to the luminance of the subject, and therefore data processing such as the adjustment of color data in the image data may be performed with comparative ease. In addition, since it is unnecessary to alter this data processing in dependence upon the video camera 1, the data processing program can be provided with universality.

In a case where the video camera 1 has $\gamma=1$ characteristics, a data conversion for a reverse gamma correction by the look-up table 12 is unnecessary.

In a case where reverse gamma-correction value is less than 1, such as a value of 0.45, the image data is expanded. That is, the number of data bits for expressing the image data is increased. In order to deal with this, a memory having a large number of data bits per pixel is used as the memory 13. For example, if the image data is data having eight bits for each color, the memory 13 is so adapted as to make it possible to store ten-bit data for each color. Further, the input look-up table 12 is so adapted as to make possible a conversion from eight bits to ten bits.

As many apparently widely different embodiments of the present invention can be made without departing from the spirit and scope thereof, it is to be understood that the invention is not limited to the specific embodiments thereof except as defined in the appended claims.

What is claimed is:

1. An image memory device comprising:

A/D converting means for converting an analog video signal from a video camera, into digital video image data;

input reverse-gamma correcting means having a rewritable input look-up table with data stored therein for applying a reverse gamma-correction to the digital video image data, which is provided by said A/D converting means, in order to convert, into linear characteristics, non-linear incident-light luminance vs. output-signal characteristics of said video camera, a reverse gamma correction being applied to the digital video image data using the data of said input look-up table with said reverse gamma correction being bound to the characteristics of said video camera;

memory means for storing the digital video image data corrected by said input reverse-gamma correcting means to always possess linearity;

output gamma correcting means having a rewritable output look-up table with data stored therein for applying a gamma correction to the digital video image data, which is read out of said memory means, in order to make the linear characteristics conform to non-linear input signal vs. output-light luminance characteristics of a display device, the gamma correction being applied to the digital video image data, which is read out of said memory means, using the data of said output look-up table with said gamma correction being related only to the characteristics of said display device; and D/A converting means for converting the digital video image data, which has been corrected by said output gamma correcting means, into an analog video signal in order to be applied to said display device.

2. The device according to claim 1, further comprising processing means for creating reverse gamma-correction data, which is to be set in said input look-up table, in dependence upon said video camera used, and gamma-correction data, which is to be set in said output look-up table, in dependence upon the display device used.

3. A method of operating an image memory device comprising the steps of:

creating, in dependence upon a video camera used, and storing beforehand in an input look-up table, reverse gamma-correction data for converting, into linear characteristics, non-linear incident-light luminance vs. output-signal characteristics of said video camera with said reverse gamma correction data being bound to the characteristics of said video camera;

creating, in dependence upon a display device used, and storing beforehand in an output look-up table, gamma-correction data for making the linear characteristics conform to non-linear input signal vs. output-light luminance characteristics of said display device with the characteristics of said gamma-correction data being related only to the characteristics of said display device;

converting an analog video signal from said video camera, into digital video image data;

applying a reverse gamma-correction to the digital video image data using the created reverse gamma-correction data of said input look-up table; and storing the corrected digital video image data, which always possesses linearity, in memory.

4. The method according to claim 3, further comprising the steps of:

reading digital video image data out of said memory means;

applying a gamma correction to the digital video image data read out of said memory using the gamma-correction data of said output look-up table;

converting the corrected digital video image data into an analog video; and applying the analog video signal to said display device.

* * * * *